United States Patent [19]
Burfield et al.

[11] Patent Number: 4,582,366
[45] Date of Patent: Apr. 15, 1986

[54] LUBRICANT SEAL FOR TRACK LINKAGE

[76] Inventors: Peter C. Burfield, 409 Sycamore, San Carlos, Calif. 94070; Robert A. Miller, 1118 Highland Dr., Modesto, Calif. 95354

[21] Appl. No.: 667,553

[22] Filed: Nov. 2, 1984

[51] Int. Cl.$^4$ .................... B62D 55/20; F16J 15/38
[52] U.S. Cl. .................................. 305/11; 305/14; 277/84; 277/95; 277/152; 277/165
[58] Field of Search .................. 305/11, 14, 58 R; 277/84, 92, 95, 152, 165

[56] References Cited

U.S. PATENT DOCUMENTS

| 3,622,165 | 11/1971 | Hatch | 277/95 |
| 3,975,028 | 8/1976 | Satsumabayashi | 277/95 X |
| 4,155,557 | 5/1979 | Grebert | 277/152 X |
| 4,438,981 | 3/1984 | Harms | 305/14 |

FOREIGN PATENT DOCUMENTS

| 2244408 | 3/1978 | Fed. Rep. of Germany | 305/11 |
| 2078336 | 1/1982 | United Kingdom | 277/152 |

Primary Examiner—David A. Scherbel
Attorney, Agent, or Firm—Owen, Wickersham & Erickson

[57] ABSTRACT

Where successive track links are connected together, each of a pair of first links has a radial end wall with an annular recess. A cylindrical tubular pin is firmly press-fitted into cylindrical openings through each first link. Into each of a pair of second links is press-fitted an annular bushing that surrounds the pin with clearance. An elastomeric annular lubricant sealing member is retained in each annular recess in a leak-tight fit. Each sealing member has an end face with an outer radial portion substantially in the same plane as the first links' radial end wall and has a radially inner portion, providing a lip which, before installation, has an edge lying axially beyond the plane of that radial end wall, and which, after installation, is in rotary sealing engagement with a radial wall of the bushing and is pushed approximately to the plane of the radial end wall. Each lip also has an innermost portion which, before installation, is larger in diameter than the pin, but on installation is swung inwardly and is forced firmly into contact with the pin to form a static seal therewith.

10 Claims, 4 Drawing Figures

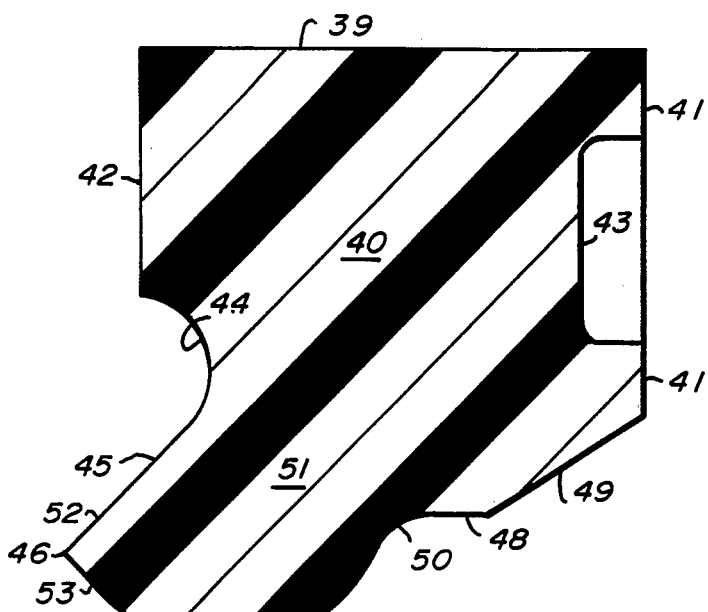
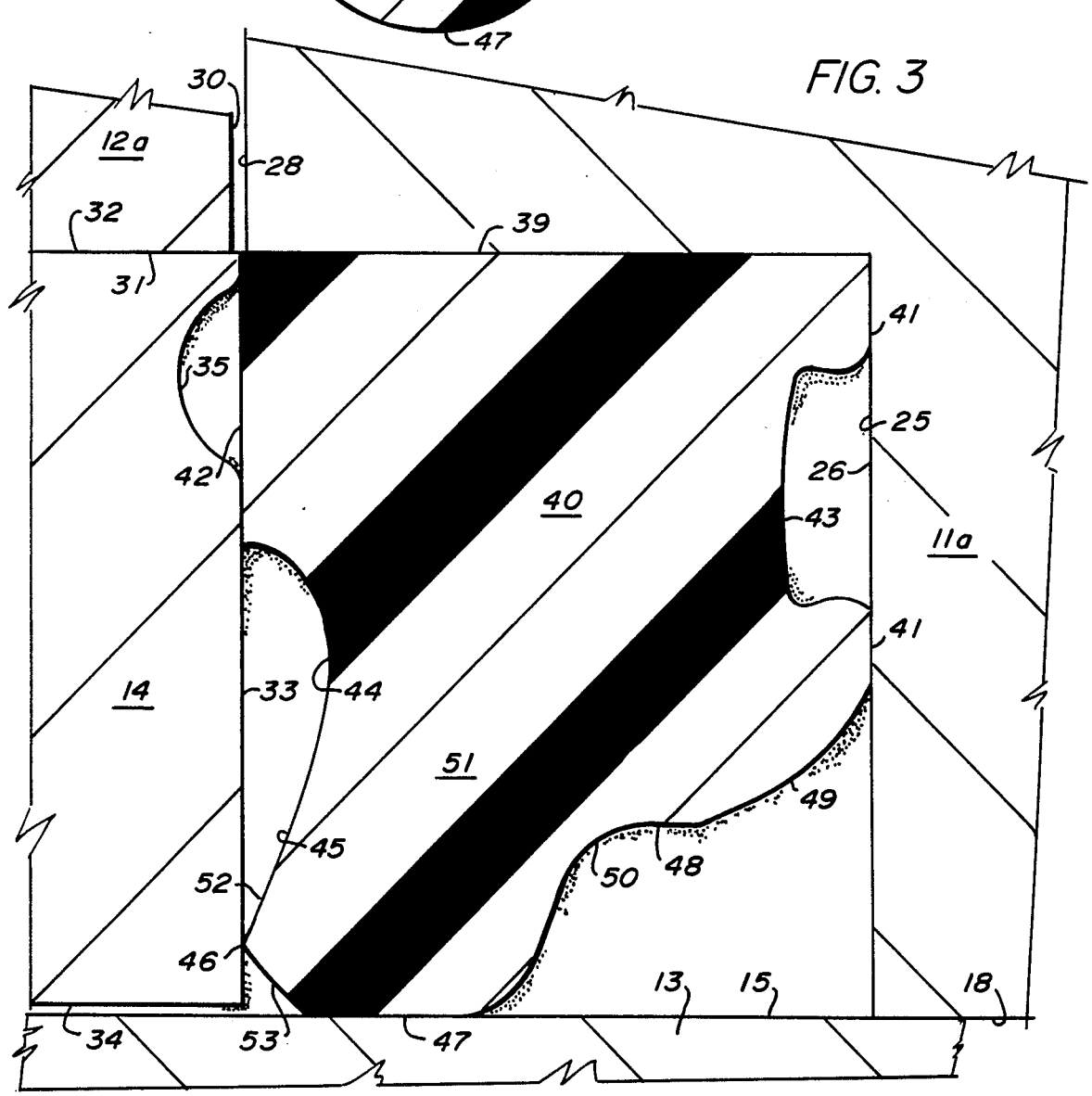

LUBRICANT SEAL FOR TRACK LINKAGE

This invention relates to a track linkage assembly, particularly to the portion thereof providing lubricant sealing in installations that lie on each side of a continuous track at each place where the successive links are connected together. The invention relates to a replacement lubricant seal at this location and to the installation which includes this replacement seal.

BACKGROUND OF THE INVENTION

Tracks such as as those on endless track laying tractors comprise a large number of individual links joined to each other. Each link is provided at each end with structure that enables it to be joined to the succeeding link. The two ends of each link are different from each other to provide a series of such linkages. The links are arranged in pairs on opposite sides of the track.

Heavy oil or, perhaps grease in some structures, is used to provide lubrication at the places where pins cross transversely between a pair of link ends and also join each pair of links to the succeeding pair of links, for at that linkage, the adjacent links can rotate somewhat relative to each other. The rotation is limited to considerably less than one hundred eighty degrees but does involve a certain amount of rotary reciprocation and wear of the bushing against the drive sprocket of the track.

Adjacent each end of each transverse pin is a lubricant sealing member. It lies between a first link end and a bushing that, in effect, is part of a second link end. The rotary seal is between the bushing and the first link end. There is also a static seal against the first link end and the pin, which is tightly press-fitted to the first link end. The sealing member provided by the original equipment manufacturer may be part of an assembly that includes a two-element sealing member and a spacer ring. In some cases a one-element sealing member may be used, and the spacer ring may in some instances comprise part of a unitary sealing member.

As indicated above, a portion of the sealing member provides static seals with the circumference of the pin and with the first link end, for the first link end and the pin, being connected together by a press-fit arrangement, comprise, for operational purposes, a single piece. The first link end provides a recess in which the sealing member or assembly are seated. The second link end and its accompanying bushing, also being fitted together by a press fit, also act as a unit; the bushing provides a radial face against which a lip of the sealing member abuts to provide the rotary seal for retaining the lubricant inside the overall assembly.

During operation, a portion of the periphery of the bushing is gradually worn down by its engagement of the drive sprocket during reciprocating rotary movement; however, since the motion is reciprocating and never reaches 180°, it is possible to repair the track linkage by removing the bushings and inverting them, so that the wearing surface against the drive sprocket is again a cylindrical arc.

However, the sealing member has simultaneously been worn out and required replacement. More significantly, it has also worn the bushing so that there there is an annular groove in the end face of the bushing. This groove tends to frustrate reinstallation. If a new seal arrangement of the original type is put in, the lubricant will immediately begin leaking from the linkage, because the new seal will not make firm contact with the face of the bushing, due to the annular groove, which is of substantial depth. Machining off of the faces of the bushings is not practical, for that would worsen the situation.

One object of the present invention is to provide for improved repair by a combination which includes a type of lubricant sealing member which is markedly different from that originally supplied. This different type of lubricant sealing member has a lip which runs on a different portion of the face, spaced away from the annular groove that has been worn into the face by the original sealing member. This new type of sealing member is suitable for use over a period even longer than the life of the original sealing member. Moreover, if the new sealing member itself wears, it can easily be replaced.

The alternative to such repair in which only the seal is replaced, is a replacement of the entire bushing at each link end. This can be very expensive since each track includes a number of these seals and bushings, typically about 80 bushings and 160 seals.

Another object of the invention, therefore, is to make possible reworking of the worn installation by mere inversion of the bushings and replacement of the seals, so that it will not be necessary to replace each bushing during the repair work.

Another object of the invention is to provide for relatively inexpensive repair requiring only inversion of the bushing and a new sealing member.

SUMMARY OF THE INVENTION

The track linkage assembly of this invention, which provides lubricant sealing, is installed on each side of a continuous track at each place where successive links are connected. The invention includes a novel replacement seal, which takes the place of an original-equipment seal and spacer, and preferably comprises only a single elastomeric member, although it may have a spring, such as a finger spring or a spring steel insert to improve longevity but increasing the cost.

In the combination, there is a first link end on each side of the track, each having a cylindrical opening therethrough, and an annular recess extending in from the end facing toward the opposite first link end. The recess ends in a radial face that extends out from the cylindrical opening to a larger-diameter cylindrical wall concentric with the cylindrical opening. The recess is provided in order to house and retain the sealing member or members; its cylindrical wall terminates at a radial end wall which extends out further radially, and is the end wall of the first link end. A cylindrical tubular pin is firmly press-fitted at each end into the cylindrical opening of one first link end; it is then coaxial with the inner cylindrical wall of the recess. This pin extends axially between the radial end walls of the pair of first links ends.

Facing each radial end wall is a second link end, on a different link, having its own radial end wall facing the radial end wall of the adjacent first link end and spaced from it enough to provide clearance during relative rotation. Each second link end has an inner cylindrical wall, preferably in line with the inner cylindrical walls of the first link ends. An annular bushing with a cylindrical outer periphery is press-fitted at each end into the inner cylindrical wall of a second link end and joins these two second link ends together. An inner cylindrical periphery of this bushing surrounds the pin, there being a small amount of clearance between the pin and the bushing to enable relative rotary movement between the bushing and the pin and therefore between the first link ends and the second link ends.

At each end of the bushing, a generally radial wall joins its outer periphery to its inner periphery. This generally radial wall is truly radial when the bushing is new, but by the time when repair is needed it has been subjected to wear by its original equipment seal, which has to be replaced. The wear forms an annular groove in that radial wall near the outer periphery of the bushing.

The original seal (and spacer, if used) are, in this invention, replaced by a single elastomeric annular lubricant sealing member. This sealing member is retained statically by friction in the cylindrical recess, a cylindrical outer periphery of the sealing member fitting tightly against the inner cylindrical wall of the first link end in a leak-tight fit. The sealing member of this invention has first and second end faces. The first end face has an outer radial portion in contact with the radial face at the inner end of the recess in the first link end. This outer radial portion may include an annular recess for accommodating elastomer movement. The second end face has an outer radial portion lying substantially in the same plane as the radial end wall of the first link end and has a recessed portion lying radially inwardly from the annular groove that has been worn into the bushing, the recessed portion terminating in a lip. Before installation of the bushing, the lip has a circular edge lying beyond the plane of the radial end wall of the first link end; during installation, the lip edge is engaged by a radially inner portion of the generally radial wall of the bushing and is pushed toward and approximately to the plane of the radial end wall of the first link end. The lip edge and the bushing's radial wall provide the rotary sealing engagement.

The lip also has an innermost portion, preferably curved, lying radially inwardly of the lip edge. Before installation of the bushing, this innermost portion is spaced away from the pin's outer periphery. On installation of the bushing, this portion is swung inwardly by the force of the lip edge and is forced firmly into contact with the pin to form a static seal therewith.

Thus, the seal, the first link end, and the pin constitute one unit for limited rotary movement relative to the second link end and the bushing as another unit. The lip edge and the outer radial portion of the sealing member are in rotary sealing engagement with the bushing's generally radial wall.

Preferably, the sealing member is made of carboxylated nitrile elastomer or some material with similar properties.

BRIEF DESCRIPTION OF THE DRAWINGS

FIG. 3 is an enlarged fragmentary view in elevation and in section of one sealing portion of the installation of FIGS. 1 and 2.

FIG. 4 is a fragmentary view in elevation and in section of the sealing element of this invention prior to installation.

DESCRIPTION OF A PREFERRED EMBODIMENT

Figure 1:
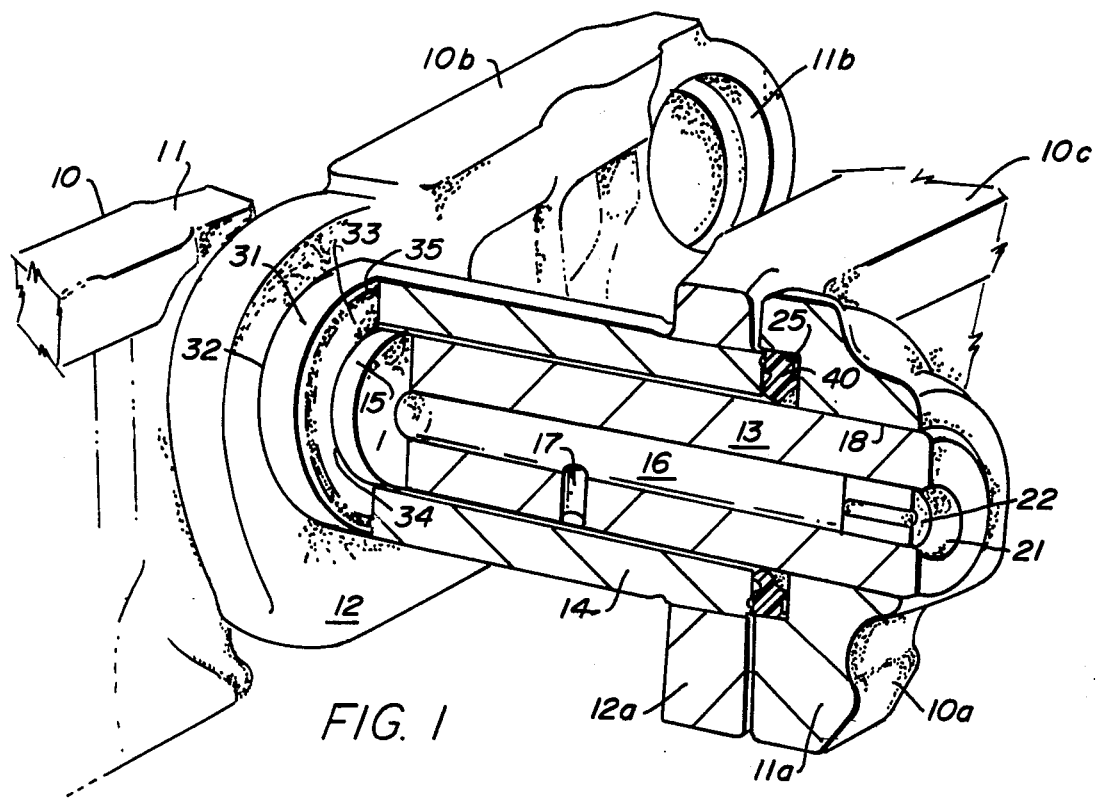
FIG. 1 is a view in perspective and partly in section of an installation embodying the principles of the invention, with a pair of first link ends, a pair of second link ends, a transverse pin, a bushing, and a pair of lubricant sealing members.
Figure 2:
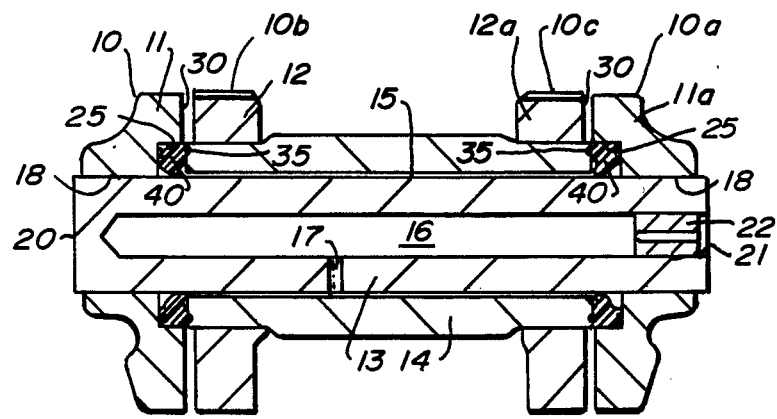
FIG. 2 is a view in elevation and in section of the installation of FIG. 1.

In FIGS. 1 and 2 can be seen portions of a track linkage assembly for a caterpillar type of tractor. In such an assembly there is a series of substantially identical links 10 and 10a etc. on each side. Each link 10 or 10a is made with one portion, herein called a first link end 11 or 11a etc., that fits on the outside of a second link end 12 or 12a of a succeeding link 10b or 10c. The other end of each link 10 or 10a comprises a second link end (not shown) that fits on the inside of a first link end 11b, e.g., of its succeeding link that is connected to that end. This description will refer to each link end 11, 11a, 11b, etc. on the outside as a "first link end", and to each link end 12, 12a, etc. as a "second link end". Each pair of first link ends 11, 11a etc is joined together by a transverse pin 13, and each pair of second link ends 12, 12a etc. is joined together by a bushing 14 in which the pin 13 can rotate.

The pin 13 is a cylindrical tube with an outer periphery 15 and an interior lubricant reservoir 16 bored therethrough, and a radial passage 17 connects the reservoir 16 to the outer periphery 15. At each end the pin 13 is immovably fixed to the first link ends 11 and 11a, its outer periphery 15 being press fitted into a cylindrical bore 18 of the link ends 11 and 11a. One end 20 of the pin 13 is solid, while at the other, open, end 21, the reservoir 16 is closed by a plug 22. Lubricant can be put into one end 21 before the plug 22 is inserted.

Each first link end 11, 11a has an annular seal-receiving recess 25 with an annular radial face 26 at its inner end that extends from its cylindrical bore 18 out to a cylindrical outer wall 27 of the recess 25. The wall 27 terminates at a radial end wall 28 of each first link end 11, 11a.

Each second link end 12, 12a is provided with a radial end wall 30 facing the end wall 28 of its adjacent first link end 11 or 11a. There is always clearance between the wall 30 and the wall 28 at each end. The bushing 14 is press-fitted at each end into a cylindrical bore 31 of the link end 12 or 12a, so that the second link ends 12 and 12a and the bushing 14 are, for operational purposes, one piece, just as the press-fitting of the cylindrical tubular pin 13 into the first link ends 11 and 11a provides what becomes functionally a single piece. The bushing 14 thus has its outer periphery 32 tightly against the cylindrical bore 31 of the second link ends 12 and 12a. It has a radial face 33 which will provide a portion of the rotary sealing engagement. The inner periphery 34 of the bushing provides clearance for the outer periphery 15 of the pin 13, so that limited relative rotation is possible. Into the radially outer portion of the face 33, which was originally flat, a somewhat irregular annular groove 35 has been worn.

As seen in FIGS. 3 and 4, a very important feature of this repair installation, is a replacement lubricant seal member 40. The seal member 40 is annular and has a cylindrical outer periphery 39 which snugly and statically fits into the recess 25 and locks frictionally against the cylindrical wall 27, so that there will be no relative rotation between the seal member 40 and the first link ends 11 and 11a.

Preferably, the seal 40 is made from a carboxylated nitrile compound having high abrasion resistance and well able to handle high-dynamic friction, having substantially lower friction than nitrile rubber. It may be made from a copolymer of butadiene and acrylonitrile with additional acid groups. It is preferably internally lubricated. For example, it may have a Shore A hardness of about 70 and temperature capabilities from about −50° F. to +225° F. Polyurethane can be used, though it is more expensive.

The seal member 40 has radial end walls 41 and 42 meeting its outer periphery 39. Preferably, the end wall 41 which is forced back into engagement with the wall 26 of the recess 25, is provided with an annular recess 43 which helps to provide for flow of rubber during the installation of the seal and thereby makes installation simpler and surer.

At the opposite end of the seal 40, the radial wall 42 bridges over the worn annular groove 35 of the bushing 14. This groove 35 has been worn into the end face 33 of the bushing 14 by the previous seal, which is not shown and which is being replaced. It will be obvious from FIG. 3 that if the seal 40 were of the type that has already worn such a groove 35 into the bushing 14, even the brand new seal would not act to make adequate contact and ensure against leakage. However, the radial face 42 comes into contact with the unworn portions of the end face 33 of the bushing 14 on each side of the groove 35.

Below this outer annular radial end wall 42 is a formed portion 44, which is seen best in FIG. 4 in its preinstallation state. The portion 44 comprises a recessed portion followed by a lip 45 leading out to an annular lip edge 46. This lip edge 46 will provide the main rotary sealing action.

Radially inwardly from the lip edge 46 is an innermost portion 47 which is preferably curved, as shown in FIG. 4, along a radius. This radially innermost portion 47 extends outwardly along the same radius to a heel portion 48 of the seal 40, and the heel 48 leads, preferably by an angular portion 49, to the end wall 41 of the seal 40. The recessed portion 44 and the place 50 where the portions 47 and 48 meet provide a narrow waist 51 about which the lip 45 can flex.

As can be seen from FIGS. 3 and 4, the innermost portion 47 at its innermost radius will not touch the pin 13 prior to installation of the bushing 14. However, installation of the bushing 14 results in the radially inner portion of the bushing's end face 33 engaging the lip edge 46 and pushing it axially and radially inwardly, due to the flexure portion or waist 51 of the seal lip 45, and this urges the innermost portion 47 radially inwardly as well as somewhat backward axially; so that the portion 47 makes very firm and prolonged contact with the outer periphery 15 of the pin 13, as can be seen in FIG. 3.

The sealing member 40, as shown, achieves a good static seal with the first link end 11 or 11a and with the pin 13. It also provides a good rotary seal with the bushing 14 against its radial face 33, especially at the lip edge 46, where the forcing back of the lip 45 tends to induce an elastic response that results in pressure, though without having to provide a separate spring member, although there may be one, if desired. Also, the end faces 42 and 37 engage, though somewhat more lightly, since they are not under the same amount of pressure. As a result, the bushing 14 is in rotary engagement with the seal lip 45, so that there is a rotary seal. Therefore, the end wall 30 of the second link end 12, 12a is not in contact with the end wall 28 of the first link end, and adequate clearance there is maintained during relative rotary movement. Since the main sealing lip edge 46 lies near the inner periphery of the face 33 of the bushings 14, no problem at all is caused by the worn groove 35 near the outer periphery of the face 33. Thus, the groove 35 causes no harm, although it, of course, provides no help either.

Preferably, the seal 40, when molded, has its lip edge 46 formed by two surfaces 52 and 53 that each lie at 45° to a radial plane, and therefore they meet each other at 90°.

Thus, when the device is temporarily disassembled for repair, the bushing 14 can be turned over 180° to place an unworn surface in position to engage the drive sprocket; the worn portion engages nothing. The seal that was originally present, is taken out and replaced by the seal 40 of the present invention, and the bushing 14 is then reinstalled to move the seal 40 into its actual sealing position, as shown in FIG. 3.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An assembly for installation on each side of a continuous track at each place where successive links are connected, including in combination:

a first link having a first link end with a cylindrical opening therethrough and a radial end wall having an annular recess therein, a cylindrical tubular pin firmly press-fitted into said cylindrical opening and extending axially beyond said radial end wall, a second link having a second link end with a radial end wall facing the radial end wall of said first link, with clearance therebetween, and an inner cylindrical wall, an annular bushing having a cylindrical outer periphery press-fitted into said inner cylindrical wall of said second link, an inner cylindrical periphery surrounding said pin with a clearance therebetween, enabling relative rotary movement of the bushing and said second link relative to said pin and said first link, and an end wall joining said outer periphery and said inner periphery, said end wall having an inner radial portion, and an elastomeric annular lubricant sealing member retained in said annular recess in a leak-tight fit, said sealing member having an end face with an outer radial portion substantially in the same place as the radial end wall of said first link and having a radially inner axially recessed portion leading out axially to a lip which, before installation of said bushing, has an edge lying axially beyond the plane of said radial end wall of said first link and which, after installation, is in rotary sealing engagement with said inner radial portion of said end wall of said bushing and is pushed by the bushing toward and approximately to the plane of said radial end wall of said first link, said lip also having an innermost portion lying radially inwardly of said lip edge, which, before installation, is larger in diameter than said pin, but on installation is swung inwardly by the pushing of said lip edge and is forced firmly into contact with said pin to form a static seal therewith.

2. The assembly of claim 1 wherein said sealing member is made of carboxylated nitrile elastomer.

3. A track linkage assembly providing lubricant sealing, for installation on each side of a continuous track at each place where successive links are connected and including replacement of an original-equipment seal and spacer by a single elastomeric member, including in combination:

a first link having a cylindrical opening therethrough, and an annular radial end wall having an annular recess therein with a radial face at its inner end, extending out from said cylindrical opening to a concentric larger-diameter cylindrical wall terminating at said radial end wall, a cylindrical tubular pin firmly press-fitted into said cylindrical opening and coaxial with said cylindrical wall and extending axially beyond said radial end wall, a second link having a radial end wall facing the radial end wall of said first link, with clearance between them, and an inner cylindrical wall in line with the inner cylindrical wall of said first link, an annular bushing having a cylindrical outer periphery press-fitted into said inner cylindrical wall of said second link, an inner cylindrical periphery surrounding said pin with a small amount of clearance therebetween, enabling relative rotary movement of the bushing and said second link relative to said pin and said first link, and a generally radial wall joining said outer periphery and said inner periphery, said generally radial wall having been radial initially but having become worn by an original equipment seal that is to be replaced, so that there is an annular groove in said radial wall near said outer periphery, and an elastomeric annular lubricant sealing member retained by friction in said annular recess with its outer periphery sealing against said inner cylindrical wall of said recess, said sealing member having first and second end faces, said first end face having an outer radial portion in contact with said radial face of said recess, said second end face having an outer radial portion substantially in the same plane as the radial end wall of said first link and having a radially inner recessed portion lying radially inward from said groove and terminating in a lip which, before installation, has an edge lying beyond the plane of said radial end wall of said first link and which, during installation, is engaged by a radially inner, radial portion of said generally radial wall of said bushing that is spaced radially in from said groove, said lip edge being pushed toward and approximately to the plane of said radial end wall of said first link, said lip also having a curved innermost portion lying radially inwardly of said lip edge which, before installation, is spaced away from said pin's outer periphery but on installation is swung inwardly by the pushing of said lip edge and is forced firmly into contact with said pin to form a static seal therewith, said seal, said first link, and said pin constituting one unit for movement relative to said second link and said bushing as another unit, said lip edge and said outer radial portion of said sealing member being in rotary sealing engagement with said bushing's generally radial wall.

4. The assembly of claim 3 wherein the outer radial portion of said first end face of said sealing member includes an annular recess for accommodating elastomer movement.

5. The assembly of claim 3 wherein said sealing member is made of carboxylated nitrile elastomer.

6. An assembly for installation as part of a continuous track at each place where successive links are connected, including in combination:

a pair of first links, each having a first link end with a cylindrical opening therethrough and a radial end wall with an annular recess therein, said end walls of the first link ends facing toward each other but spaced well apart from each other, a cylindrical tubular pin firmly press-fitted into each said cylindrical opening and connecting said first link ends together, a pair of second links each having a second link end with a radial end wall facing and spaced from the radial end wall of a said first link end and each having an inner cylindrical wall generally aligned with the cylindrical wall of said first link, an annular bushing having a cylindrical outer periphery press-fitted at each end into a said inner cylindrical wall of a said second link and thereby connecting said second link ends together, said bushing having an inner cylindrical periphery surrounding said pin with a small amount of clearance therebetween, enabling relative rotary movement of the bushing and said second links relative to said pin and said first links, and an end wall at each end joining said outer periphery and said inner periphery, each said end wall having an inner radial portion, and an elastomeric annular lubricant sealing member frictionally retained in each said cylindrical recess of said first links in a leak-tight fit, each said sealing member having an end face with an outer radial portion substantially in the same plane as the radial end wall of its said first link end and having a radially inner recessed portion, with a lip which, before installation, has an edge lying axially beyond the plane of said radial end wall of its said first link and which, after installation, is in rotary sealing engagement with a said inner radial portion of a said end wall of said bushing and is pushed toward and approximately to the plane of said radial end wall of its said first link, each said lip also having an innermost portion lying radially inwardly of said lip edge and which, before installation, is larger in diameter than said pin, but on installation is swung inwardly by the pushing of said lip edge and is forced firmly into contact with said pin to form a static seal therewith.

7. An elastomeric annular lubricant sealing member for a track linkage, said sealing member having an end face with an outer radial portion, a radially inner recessed portion, and a lip which, before installation, has an edge lying axially beyond the plane of said end face and which, upon installation, is adapted to be placed in rotary sealing engagement with a radial wall and to be pushed toward and approximately to the plane of said end face, said lip also having an innermost portion lying radially inwardly of said lip edge, which, upon installation is swung inwardly by the pushing of said lip edge to narrow its inner periphery.

8. The sealing member of claim 7 having another end face with an outer radial portion provided with an annular recess therein to accommodate flow of elastomer.

9. The sealing member of claim 7 wherein said radially inner recessed portion has a radially outer axially inwardly curved portion and a radially inner wall extending at 45° to a radial plane and forms one wall of the lip, meeting at said lip edge another wall at 90° to it and 45° to said radial plane and leading to said innermost portion.

10. The sealing member of claim 9 wherein said innermost portion is a circular arc before said pushing and leads on its side opposite said lip edge out to a heel portion of the sealing member having a generally cylindrical inner periphery and providing where they meet, in cooperation with said axially inwardly curved portion, a flexing waist portion for said lip.

* * * * *